(12) United States Patent
Peyrisse et al.

(10) Patent No.: US 8,226,045 B2
(45) Date of Patent: Jul. 24, 2012

(54) BUNDLE COMPRISING TWO PAIRS OF TANKS, AND AN AIRBORNE LAUNCHER INCLUDING SUCH A BUNDLE

(75) Inventors: Daniel Peyrisse, Saint Marcel (FR); Dominique Le Louedec, Saint Marcel (FR); Jean-Marie Conrardy, Courcelles sur Seine (FR)

(73) Assignee: SNECMA, Paris (FR)

( * ) Notice: Subject to any disclaimer, the term of this patent is extended or adjusted under 35 U.S.C. 154(b) by 317 days.

(21) Appl. No.: 12/546,252

(22) Filed: Aug. 24, 2009

(65) Prior Publication Data
US 2010/0059630 A1 Mar. 11, 2010

(30) Foreign Application Priority Data

Sep. 8, 2008 (FR) ...................................... 08 56002

(51) Int. Cl.
*B64G 1/00* (2006.01)
(52) U.S. Cl. .................................................... 244/172.3
(58) Field of Classification Search .................. 244/172, 244/2, 172.3, 135 R, 135 C
See application file for complete search history.

(56) References Cited

U.S. PATENT DOCUMENTS

| 3,180,084 | A |   | 4/1965  | Meeks         |          |
|-----------|---|---|---------|---------------|----------|
| 3,243,150 | A | * | 3/1966  | Reed          | 244/135 R|
| 3,286,629 | A | * | 11/1966 | Laue          | 244/159.4|
| 4,699,339 | A | * | 10/1987 | Rosen et al.  | 244/172.2|
| 4,741,502 | A | * | 5/1988  | Rosen         | 244/158.9|
| 5,533,331 | A |   | 7/1996  | Campbell et al.|         |
| 5,816,539 | A | * | 10/1998 | Chan et al.   | 244/159.4|

FOREIGN PATENT DOCUMENTS

| RU | 2059858     | 5/1996 |
| WO | WO 88/02332 | 4/1988 |

* cited by examiner

*Primary Examiner* — Tien Dinh
*Assistant Examiner* — Keith L Dixon
(74) *Attorney, Agent, or Firm* — Weingarten, Schurgin, Gagnebin & Lebovici LLP

(57) ABSTRACT

The bundle comprises two pairs of same-volume cylindrical tanks, each pair comprising two tanks containing a same-density propellant suitable for flowing at the same volume flow rate, the four tanks being fastened directly to one another via reinforcing hoops in such a manner that the center of gravity of each of said pairs remains continuously on the axis of said bundle while the propellants are flowing.

6 Claims, 4 Drawing Sheets

BUNDLE COMPRISING TWO PAIRS OF TANKS, AND AN AIRBORNE LAUNCHER INCLUDING SUCH A BUNDLE

BACKGROUND OF THE INVENTION

The invention relates to a bundle of tanks and to an airborne launcher including such a bundle.

In the present state of the art, airborne launchers use tanks of circular section that are in alignment one behind another along the axis of the launcher.

This configuration imposes a certain number of size constraints on the carrier airplane, in particular concerning systems for securing and releasing the launcher, and concerning the positioning of the landing gear.

OBJECT AND A SUMMARY OF THE INVENTION

The present invention mitigates the above-mentioned drawbacks by providing a bundle comprising two pairs of same-volume cylindrical tanks, each pair comprising two tanks containing a same-density propellant suitable for flowing at the same volume flow rate, the four tanks being fastened directly to one another via reinforcing hoops in such a manner that the center of gravity of each of said pairs remains continuously on the axis of said bundle while the propellants are flowing.

In a particular embodiment, the reinforcing hoops form integral portions of the tanks.

The concept of tanks in a bundle has never been used in the context of airborne launchers.

The person skilled in the art understands that the engine fed from said tanks should be controlled in such a manner that the four tanks empty simultaneously, so that the center of gravity of the stage remains continuously on the axis of the bundle.

By way of nonlimiting example, one pair of tanks may contain nitrogen peroxide (chemical formula $N_2O_4$) and the other pair of tanks monomethyl hydrazine (MMH).

When the bundle is used in an airborne launcher, it serves advantageously to reduce considerably the length of the launcher, because the tanks are no longer in alignment one after another.

In practice, and for given mass, the ratio between the length and the width of the stage in which the bundle of the invention is to be found (the top stage) is equivalent to the ratio of a conventional stage in which the tanks are in alignment.

Advantageously, the increase in the main cross-section that results from using the invention is of little importance because of the size of the nose cone of the launcher.

In a particular embodiment of the invention, the section of the top stage is square, with a rounded corners.

This characteristic serves advantageously to keep the main cross-section under control.

Furthermore, in a particular embodiment of the invention, some of the reinforcing hoops include fastener means for an engine or for a payload.

In other words, and in most advantageous manner, the tanks themselves form the structure of the launcher.

Thus, mechanical forces, in particular when delivering thrust, are taken up by the tanks and their own fastener means. By means invention, there is therefore no need to use a thrust cone, as is the practice in conventional launcher structures, thereby achieving a most advantageous saving in mass.

In a second aspect, the invention provides an airborne launcher including a bundle of tanks as described above together with fastener means secured to two of the tanks of the bundle, enabling a wing of the launcher to be fastened directly thereto.

In this aspect of the invention, the launcher wing may be fastened directly to the bundle of tanks, e.g. via fittings secured to the tanks.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF AN EMBODIMENT

Figure 1:
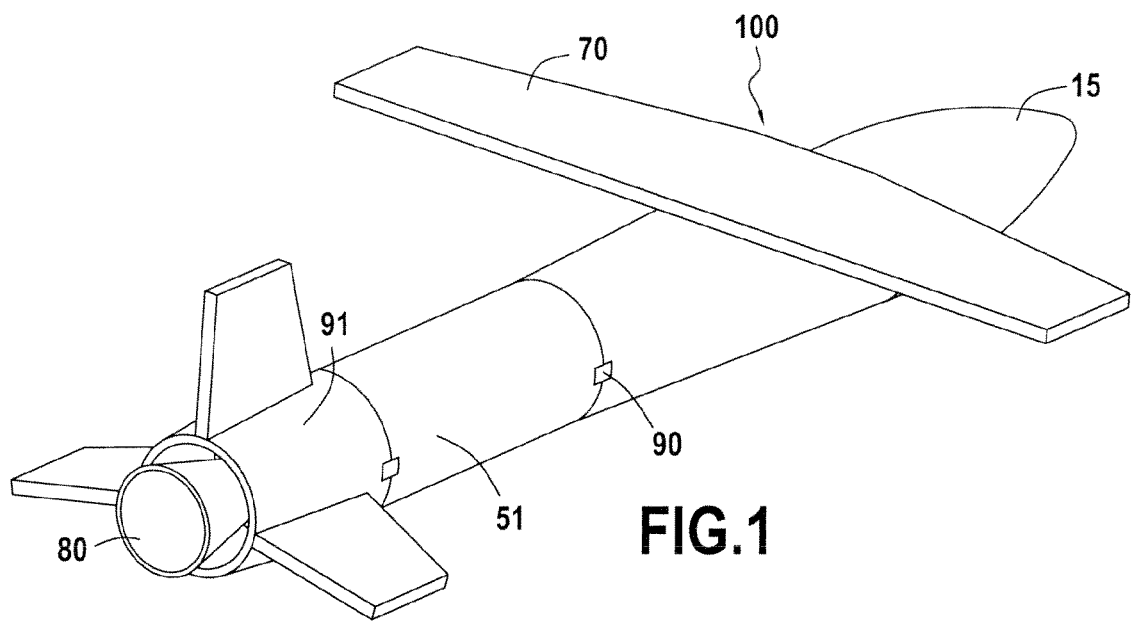
FIG. 1 is a perspective view of an airborne launcher in accordance with the invention in a particular embodiment thereof.

FIG. 1 is a very general perspective view of an embodiment of an airborne launcher 100 in accordance with invention.

In this figure, reference 15 designates a bullet-shaped nose cone designed to protect a payload (not shown in this figure), while also imparting the required aerodynamic shape to the launcher 100.

Behind the nose cone, there is an inter-stage skirt 51, itself followed by a solid fuel stage 91, in which there is to be found a block of solid fuel referenced 80.

In this figure, the inter-stage fastenings are referenced 90.

The bundle in accordance with the invention is situated in a top stage covered by a nose-cone 15 and the inter-stage skirt 51.

In the embodiment of FIG. 1, the airborne launcher 100 in accordance with invention includes a wing 70 and a plurality of tail fins in its rear portion.

Figure 2:
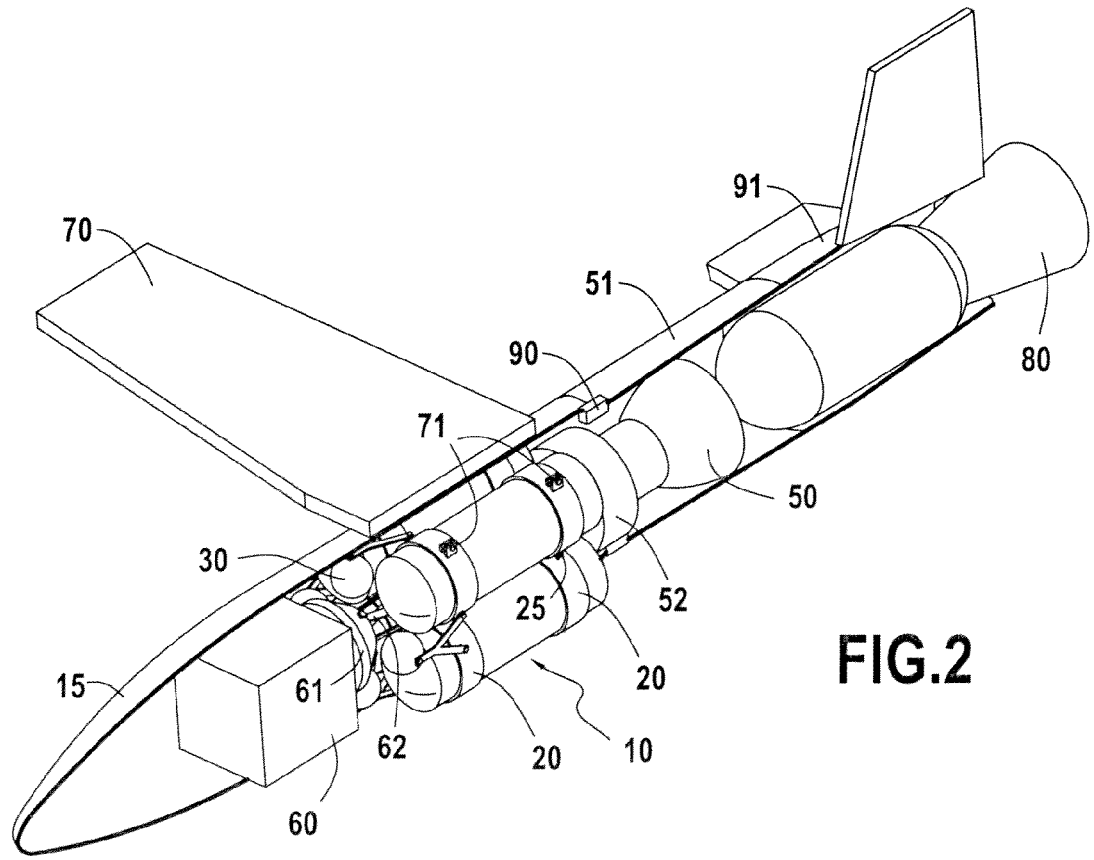
FIG. 2 is a partially cutaway perspective view of the FIG. 1 airborne launcher.

FIG. 2 is a partially cutaway view showing the general internal structure of the launcher.

Under the nose cone 15 there is a payload 60, for example a satellite.

Reference 10 is an overall reference to a bundle of four tanks that are fastened directly to one another via reinforcing hoops 20.

Figure 3:
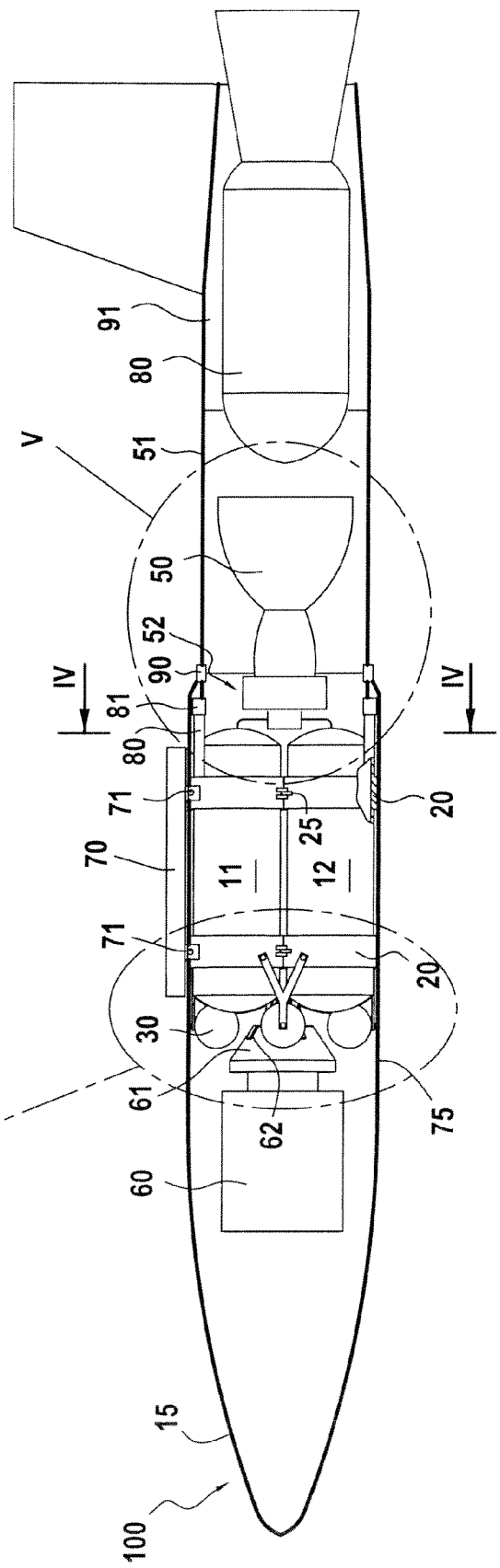
FIG. 3 is a longitudinal section of the FIG. 1 airborne launcher showing details on a larger scale for visualizing the way the payload and the engine are fastened to the bundle of the launcher.
Figure 3:
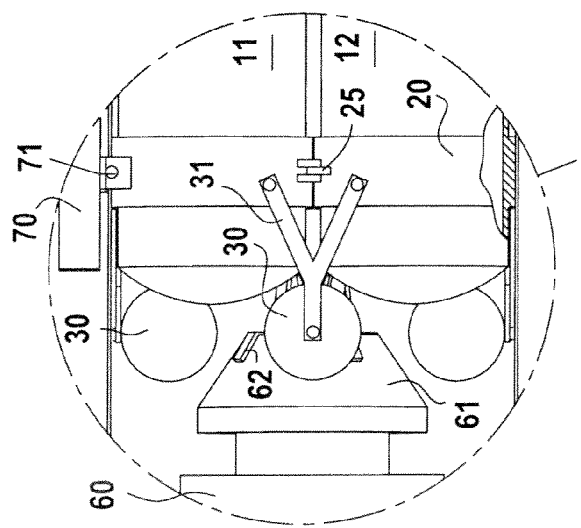

The reinforcing hoops 24 are integral portions of the tanks, as shown in the details of FIG. 3.

As can be seen in FIG. 2, the axis of the bundle coincides with the axis of the airborne launcher.

In accordance with invention, the payload 60 is fastened directly to the bundle, as is the engine 15.

In accordance with invention, and the wing 70 is fastened directly to the bundle 10.

In the example described herein, the airborne launcher 100 has four high-pressure helium spheres, referenced 30, the purpose of expelling the propellants.

FIG. 3 is a longitudinal section of the launcher shown in FIG. 2, having two details on a larger scale for showing firstly how the payload 60 and the helium spheres 30 are fastened to the bundle 10, and secondly how the engine 50 is fastened to the bundle 10.

Figure 5:
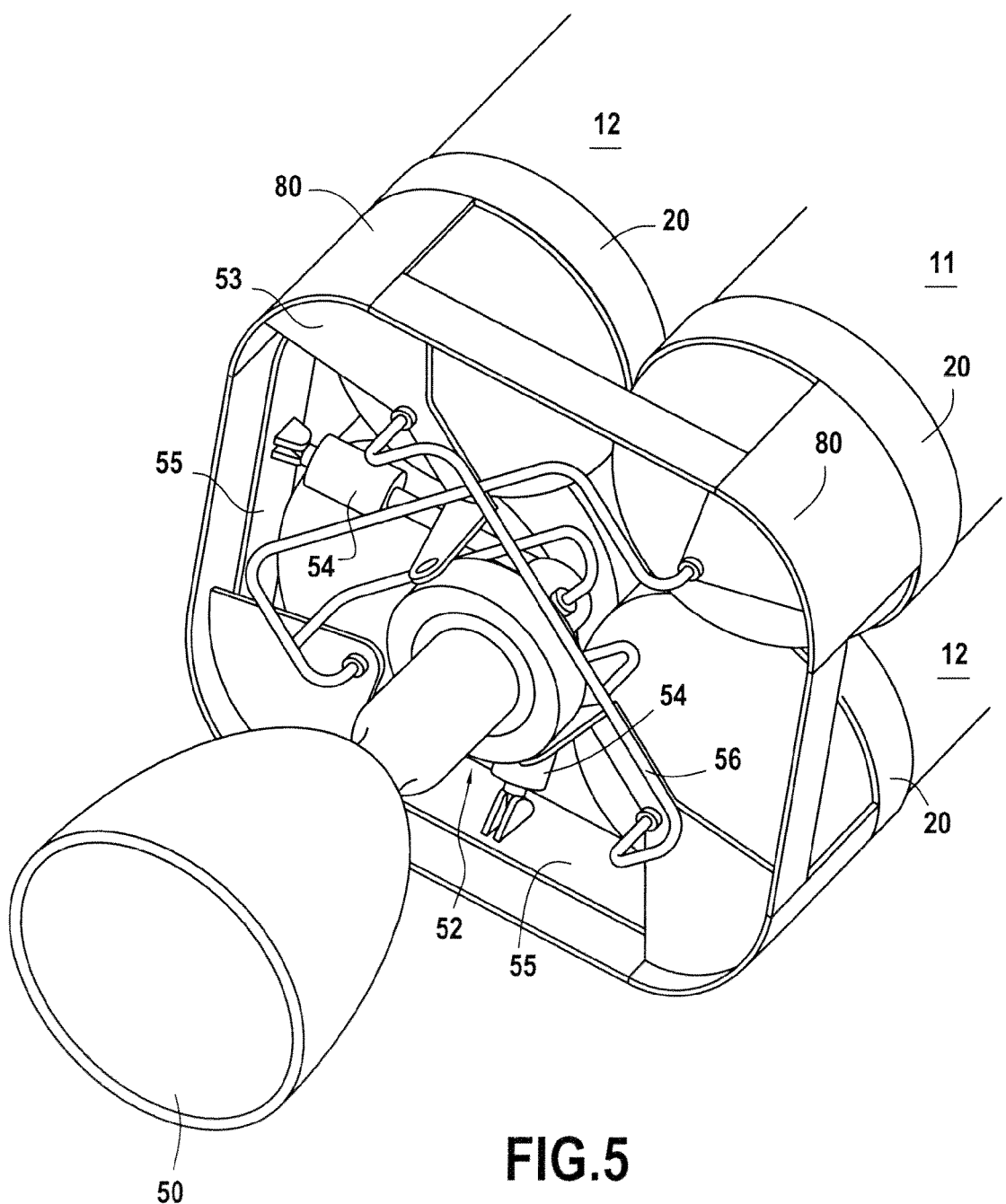
FIG. 5 shows a detail of FIG. 3 on a larger scale.

In the embodiment described herein, the skirt 51 presents a bifurcation substantially in the form of a fork for forming:

an outer ring connected to the nose cone 15 by a fastener 90 suitable for being sheared by a first explosive pyrotechnic cord in order to release the nose cone 15; and an inner ring connected to the reinforcing hoops 20 by a connection tab 80 shown in detail in FIG. 5, which tab may be sheared by a second pyrotechnic cord 81 in order to release the inter-stage skirt 51.

Figure 4:
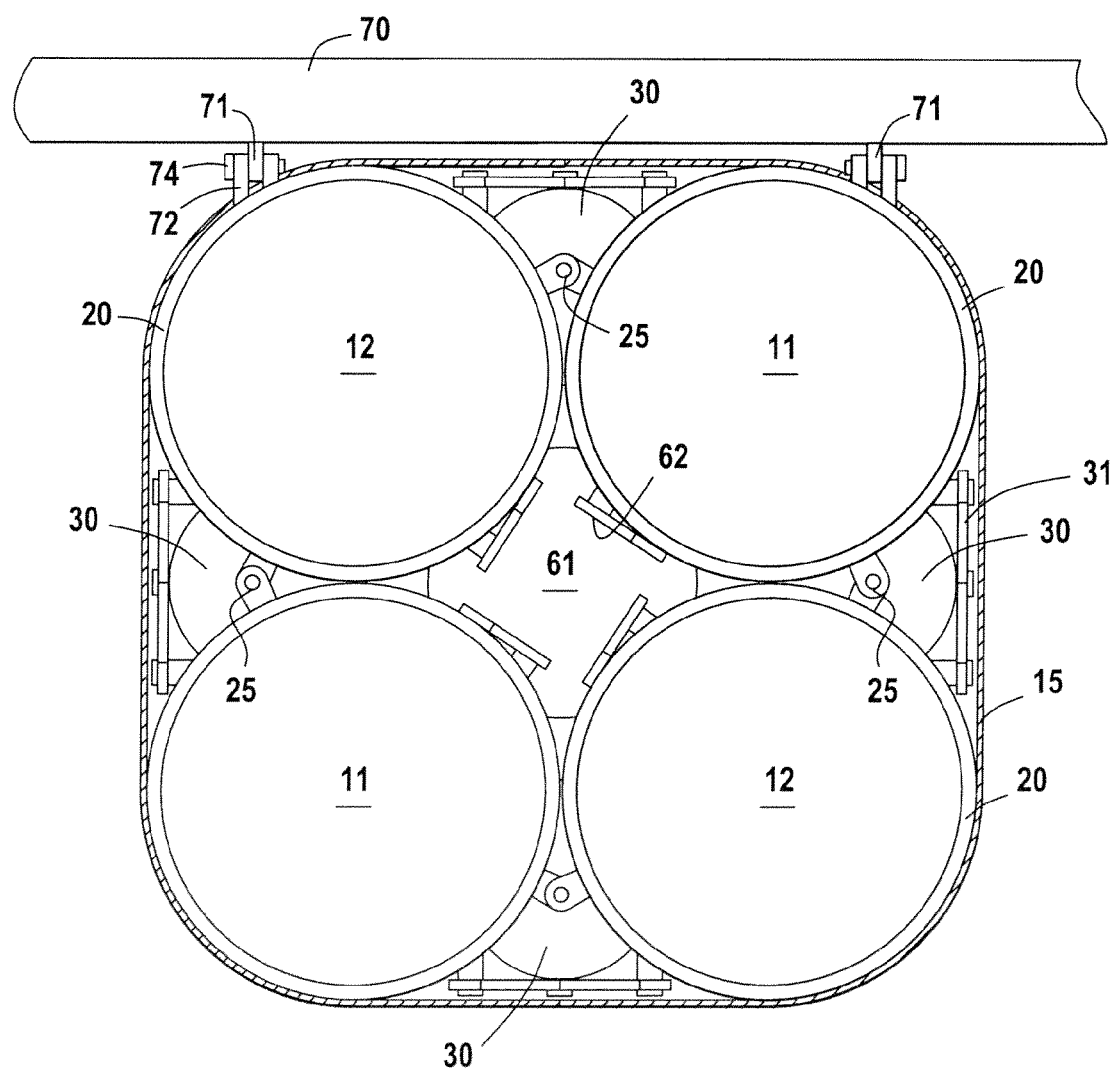
FIG. 4 is a cross section IV/IV of FIG. 3.

FIG. 4 is a section IV/IV of the view shown in FIG. 3. It shows that in this embodiment, the casing of the top stage 75 is substantially square in section, with rounded corners, this shape serving to minimize the main cross-section as much as possible.

The bundle 10 described herein has a pair of first tanks referenced 11 and a pair of the second tanks referenced 12.

Both tanks in each pair contain the same propellant and they deliver it at the same volume flow rate.

The tanks are fastened directly to one another via the reinforcing hoops 20 by means of fittings referenced 25

These fittings 25 are arranged in such manner as to minimize the distance between two tanks.

The helium spheres 30 are fastened to the reinforcing hoops 20 by links 31.

In the example described herein, the payload 60 is fastened to a support plate 61, itself connected to the tanks 11 and 12 by means of shroud sectors 62 that are welded to the reinforcing hoops 20, as shown in FIG. 4.

In accordance with the invention, the injection means 52 of the airborne launcher 100 are adapted to control feed to the engine 50 in such a manner that all four tanks 11, 12 empty simultaneously.

In the embodiment described herein, the engine 50 is steerable, the purpose of changing the direction of its thrust.

For this purpose, the engine 50 is mounted on a universal block 52 connected to the reinforcing hoops 20 by a support plate 53, with the direction in which the engine points being adjustable by steering actuators 54.

In the embodiment described herein, the supports for the actuators 54 are fastened to the reinforcing hoops 20 by fittings 55.

In the embodiment described herein, a wing 70 is fastened directly to the tanks 11, 12 of the airborne launcher by fastener means 71 that are secured to the tanks.

In the example described herein, the wing 70 includes more specifically eyelets 71 that are connected by pins 74 to mountings or forks 72 that are themselves welded to the reinforcing hoops 20, which pins 74 are explosive shear pins that enable the wing 70 to be jettisoned.

What is claimed is:

1. An airborne launcher, including a bundle of tanks, the bundle having an axis and comprising two pairs of same-volume cylindrical tanks, each pair comprising two tanks containing a same-density propellant suitable for flowing at the same volume flow rate, said four tanks being fastened directly to one another via reinforcing hoops in such a manner that the center of gravity of each of said pairs remains continuously on the axis of said bundle while said propellants are flowing; and wherein the bundle includes fastener means secured to two of said tanks enabling a wing of said launcher to be fastened directly thereto.

2. An airborne launcher according to claim 1, wherein said reinforcing hoops form integral portions of said tanks.

3. An airborne launcher according to claim 1, wherein at least some of said reinforcing hoops include fastener means for an engine and for a payload.

4. An airborne launcher according to claim 1, wherein a section of a top stage of the airborne launcher in which said bundle is to be found is of a cross-section that is square with corners that are rounded.

5. An airborne launcher according to claim 1, wherein:

the two pairs of tanks are arranged as four tanks disposed in a two-by-two array; and the two tanks of each pair containing the same-density propellant are arranged in diagonal opposition within the two-by-two array.

6. An airborne launcher according to claim 1, wherein:

the two pairs of tanks are arranged as four tanks disposed in a two-by-two array, at least one reinforcing hoop disposed circumferentially around each tank; and fittings are attached between adjacent reinforcing hoops of adjacent tanks.

\* \* \* \* \*